(12) United States Patent
Herrich et al.

(10) Patent No.: US 12,103,102 B2
(45) Date of Patent: Oct. 1, 2024

(54) METHOD AND APPARATUS FOR FRICTION CURRENT JOINING

(71) Applicant: KUKA Deutschland GmbH, Augsburg (DE)

(72) Inventors: Jörg Herrich, Mering (DE); Stefan Habersetzer, Rinnenthal (DE); Klaus Schneider, Friedberg (DE); Andreas Burger, Augsburg (DE); Andy Pham, Augsburg (DE)

(73) Assignee: KUKA Deutschland GmbH (DE)

( * ) Notice: Subject to any disclaimer, the term of this patent is extended or adjusted under 35 U.S.C. 154(b) by 0 days.

(21) Appl. No.: 17/605,010

(22) PCT Filed: Apr. 24, 2020

(86) PCT No.: PCT/EP2020/061466
§ 371 (c)(1),
(2) Date: Oct. 20, 2021

(87) PCT Pub. No.: WO2020/216903
PCT Pub. Date: Oct. 29, 2020

(65) Prior Publication Data
US 2022/0212281 A1    Jul. 7, 2022

(30) Foreign Application Priority Data

Apr. 25, 2019 (DE) ..................... 10 2019 110 664.8

(51) Int. Cl.
*B23K 20/00* (2006.01)
*B23K 20/12* (2006.01)
(Continued)

(52) U.S. Cl.
CPC .......... *B23K 20/129* (2013.01); *B23K 20/121* (2013.01); *B23K 11/02* (2013.01); *B23K 13/04* (2013.01); *B23K 2103/14* (2018.08)

(58) Field of Classification Search
CPC .... B23K 20/12; B23K 20/121; B23K 20/129; B23K 9/08
See application file for complete search history.

(56) References Cited

U.S. PATENT DOCUMENTS

| 5,519,182 A | 5/1996 | Linzell |
|---|---|---|
| 2011/0100981 A1 | 5/2011 | Lim |

(Continued)

FOREIGN PATENT DOCUMENTS

| DE | 69313131 T2 | 3/1998 |
|---|---|---|
| DE | 299 22 396 U1 | 11/2000 |

(Continued)

OTHER PUBLICATIONS

KR20080057444A computer English translation (Year: 2023).*

(Continued)

*Primary Examiner* — Erin B Saad
(74) *Attorney, Agent, or Firm* — Dorton & Willis, LLP (57) ABSTRACT

A method and apparatus for joining using friction and current, wherein the friction/current joining apparatus includes a friction device, a forging device, an electrical current source, and a programmable controller, as well as workpiece holders for the workpieces to be joined. The friction/current joining apparatus is controlled such that, in a contacting phase, the workpieces are initially moved along a process axis, and their mutually facing joining surfaces oriented transverse to a common process axis are brought into contact. In a grinding phase, while subjected to contact pressure by mutual relative movement, the joining surfaces, are ground together and made smooth. At the end of the grinding phase, the relative frictional movement is permanently stopped and, in a forging phase following the grinding phase, the workpieces are pressed together, plasticized, and joined while subjected to contact pressure on their (Continued)

contacting joining surfaces along the process axis, and subjected to conductive heating with electrical current.

20 Claims, 7 Drawing Sheets

(51) Int. Cl.
　　　*B23K 11/02*　　　(2006.01)
　　　*B23K 13/04*　　　(2006.01)
　　　*B23K 103/14*　　(2006.01)

(56) References Cited

U.S. PATENT DOCUMENTS

| | | |
|---|---|---|
| 2011/0198390 A1 | 8/2011 | Richter |
| 2013/0092662 A1 | 4/2013 | Fukami et al. |
| 2018/0065205 A1 | 3/2018 | Geyer et al. |

FOREIGN PATENT DOCUMENTS

| | | |
|---|---|---|
| DE | 202013102617 U1 | 9/2014 |
| DE | 102015226827 A1 | 7/2017 |
| DE | 10 2016 217 024 A1 | 3/2018 |
| JP | 2004114108 A | 4/2004 |
| JP | 201224840 A | 2/2012 |
| KR | 20080057444 A | 6/2008 |
| KR | 1020080057444 | 12/2010 |
| WO | 2010 054 627 A1 | 5/2010 |

OTHER PUBLICATIONS

DE29922396 computer English translation (Year: 2023).*
KR20080057444 English translation (Year: 2024).*
European Patent Office; Search Report in related International Patent Application No. PCT/EP2020/061466 dated Aug. 21, 2020; 2 pages.
German Patent Office; Search Report in related German Patent Application No. 10 2019 110 664.8 dated Feb. 18, 2020; 12 pages.
Chinese Patent Office; Office Action in related Chinese Patent Application No. 2020800311292 dated Aug. 9, 2023; 10 pages.
Chinese Patent Office; Office Action in related Chinese Patent Application No. 202080031129.2 dated Mar. 21, 2024; 7 pages.
Japanese Patent Office; Office Action in related Japanese Patent Application No. 2021-563422 dated Apr. 12, 2024; 7 pages.

* cited by examiner

METHOD AND APPARATUS FOR FRICTION CURRENT JOINING

CROSS-REFERENCE TO RELATED APPLICATIONS

This application is a national phase application under 35 U.S.C. § 371 of International Patent Application No. PCT/EP2020/061466, filed Apr. 24, 2020 (pending), which claims the benefit of priority to German Patent Application No. DE 10 2019 110 664.8, filed Apr. 25, 2019, the disclosures of which are incorporated by reference herein in their entirety.

TECHNICAL FIELD

The invention relates to a method and an apparatus for joining two or more workpieces by friction and current.

BACKGROUND

It is known from practice to join two or more workpieces by friction welding, the workpieces being brought into contact with each other at their joining surfaces, and briefly ground together with relative mutual movement under low contact pressure. In a subsequent friction phase with significantly increased contact pressure and continuing relative movement, the contacting joining surfaces of the workpieces are plasticized by the frictional heat. Subsequently, they are pressed against each other by a high forging pressure in a forging phase. In the grinding phase and the forging phase, the plasticized material is laterally displaced in the joining zone between the joining surfaces of the workpieces, forming a bulge, and the workpiece is also shortened. The conventional friction welding process can lead to fiber deflections and hardening in the joining zone.

DE 299 22 396 U1 teaches such a friction welding with a grinding and friction phase, which is designed for critical workpieces with very different melting behavior to be friction welded. With an additional heating device, in addition to the frictional melting heat, additional heating energy is applied to one of the workpieces being friction-welded, in a targeted manner, or with a stronger effect on one side, in order to compensate for the different melting behavior and to additionally heat the workpiece, which is more difficult to melt. The additional heating device is preferably an induction heater, wherein modifications with hot air, an open flame, or with a resistance heater, etc. applied to a workpiece, are possible.

It is also known from practice to electrically-inductively preheat the workpieces being welded during friction welding, or to reheat the welded part electrically after the joining process. DE 10 2016 217 024 A1 and WO 2010/054627 A1 teach inductive heating of the workpieces during the friction phase, and the relative movement of the workpieces to produce friction.

DE 693 13 131 T2 relates to the abrasion welding of workpieces that are clamped one inside the other, and thereby moved relative to each other in the insertion direction, giving rise to abrasion at the contact points or clamping points, and amplification of the abrasion during the relative movement by an electrical heater. In the process, by welding the abraded particles, an abrasion bond with a strong diffusion bond is created.

SUMMARY

It is the object of the present invention to create an improved joining technique.

The claimed joining technology—that is, the method and the apparatus for joining using friction and current—has various advantages.

According to the claims, the workpieces are joined by friction and current in a multi-step process which is divided into a contacting phase, a subsequent grinding phase, and an immediately following forging phase with electrical conductive heating.

The additional friction phase with frictional relative movement under high contact pressure and deep plasticization of the workpieces due to the resulting frictional heat, as is present in conventional friction welding, is omitted. In the invention, the workpieces are instead heated and plasticized by the conductive electrical heating. This also eliminates the high torque peaks when the frictional relative movement is halted, which produce high mechanical stress on a conventional friction welding machine.

The process can begin with an upstream calibration in which the workpieces are brought into contact during a position detection and zero point calibration, and then are moved apart again, with a distance measurement. After this, the contacting phase begins. In the friction/current joining process, a path control or path regulation is preferably used to set the desired length of the joined prefabricated part.

In the contacting phase, the joining surfaces of the workpieces being joined, facing each other, are brought closer to each other, and are brought into contact. This can be done along a common process axis or machine axis. The joining surfaces are oriented transverse, in particular perpendicular, to the process axis. This axis is preferably arranged horizontally and has a predominantly horizontal directional component.

In the grinding phase, the contacting joining surfaces are exclusively ground and made smooth while subjected to contact pressure by mutual relative movement. The mutual relative movement takes place transverse to the process axis. The joining surfaces can be made smooth, mutually adapted, and brought into contact over the entire surface. This has advantages for an improved flow of current. The frictional energy and heat introduced in the grinding phase only serve to smooth the contacting joining surfaces. It is not sufficient to plasticize and melt the adjacent workpiece regions.

The contact pressure can act along the process axis. The frictional relative movement is preferably a rotary movement around the process axis, which can take place continuously or in an oscillating manner. The grinding phase begins with the contacting of the joining surfaces. The relative movement of the workpieces can start before contact is made, with workpieces that are still distant. In the grinding phase, defects in shape, bevel cuts, dirt, oil deposits and the like can be removed from the joining surfaces.

The workpieces can each have a plurality of joining surfaces. Due to the grinding, all contacting joining surfaces can be made to conform to each other, and can contact each other over the entire, flat surface for the subsequent joining. This is favorable for the uniform heating of all joining surfaces during friction/current joining with electrical conductive heating.

At the end of the grinding phase, the workpieces or the contacting joining surfaces are brought to a motionless state. The termination of the frictional relative movement is preferably permanent, that is to say the frictional relative movement is not resumed in the immediately following forging phase.

In the forging phase, the workpieces or the contacting joining surfaces are pressed together, plasticized and joined subjected to contact pressure, with conductive heating with electrical current. The contact pressure acts along the process axis. The electrical current is preferably a regulated constant current. The use of direct current is favorable. The current density can advantageously be, for example, 30-50 A/mm$^2$.

The workpieces are made of an electrically conductive material. Ferrous metals, in particular steels or cast ferrous materials, are particularly suitable and preferred for frictional/current joining. Titanium materials or nickel-based alloys are also advantageously suitable.

In the forging phase, the axial contact pressure can be the same as in the grinding phase or, preferably, it can be increased slightly. The conductive electrical heating is present immediately at the beginning of the forging phase, and continues through the forging phase.

In an advantageous embodiment, the electrical voltage or current is only switched on after the frictional relative movement has ended, in particular in the case of stationary, contacting workpieces that are subjected to contact pressure. The plasticizing and joining of the workpieces subjected to contact pressure takes place primarily through the conductive heating in the forging phase. The heat required for joining is substantially applied by means of electrical conductive heating. During the forging phase, it is advantageous if the workpieces do not perform any frictional movement relative to each other.

The claimed friction/current joining technique offers high reproducibility and quality of the joining technique and of the manufactured joined parts. The same amount of energy can always be converted and used for the joining process. The even flow of current through the participating joining surfaces, and the even heating of these joining surface regions, ensure high and even joint quality. The contact surfaces and the adjacent workpiece regions are plasticized by the heat of the current. The usual fluctuations in heating due to corrosion, roughness, lubricating film etc. on the joining surfaces in friction welding can be avoided.

With the known inductive heating of the workpieces, the same qualities cannot be achieved as with friction/current joining according to the invention with conductive electrical heating. Induction heating is also more inefficient.

Compared to other joining techniques, the claimed friction/current joining technique succeeds with less workpiece shortening, and enables improved and more precise compliance with the dimensional specifications for the joined part or welded part. With friction/current joining, length control for the joined part or welded part can be carried out more easily and more precisely.

In addition, lower forces and torques are required for positioning, in particular rotational positioning, of the workpieces during joining. The positioning can be adjusted easily and precisely during the grinding, and does not have to be changed during the subsequent joining with forging and conductive heating. Any position specifications, for example a rotational position of the workpieces on the finished joined or welded part, can be adhered to exactly. A bulge formation on the joining zone of the workpieces can be avoided or at least significantly reduced compared to friction welding.

With friction/current joining, thanks to the conductive electrical heating of the workpieces, the temperatures in the joining zone and in the other workpiece regions can be better monitored and controlled and, if necessary, adjusted. As part of a temperature detection, the friction/current joining process for metals can be optimized using its temperature-dependent transformation and phase behavior, as well as the associated TTT diagrams. The desired joining structure can be achieved in a targeted, safe and reproducible manner.

The temperature can be detected directly or indirectly, for example via the electrical resistance R, for example for the purposes of process monitoring. The electrical resistance R can also be used to control or regulate the grinding process, for example with a low current density. This results in advantages for cycle time savings, reproducibility and process reliability, and quality assurance.

The claimed friction/current joining technique achieves shorter process times and a more economical use of energy compared to the prior art. The conductive heating with electrical current of the workpieces being joined enables the workpieces to be heated evenly, quickly and precisely. In contrast to conventional friction welding, the temperature rise or heating takes place not only in a narrowly bounded area at the joining zone, but also in the adjoining other workpiece regions through which the current flows. The heating zone is considerably widened in the case of friction/current joining. The heating can take place uniformly over the cross-section of the joining surfaces of the workpieces. In this way, the hardening of the joined part in the joining zone, which is usual in conventional friction welding, can be prevented or at least reduced.

Thanks to the uniform conductive electrical heating of the workpieces being joined, a contact pressure in the forging phase that is significantly lower than in conventional friction welding is sufficient for the friction/current joining process. It can be 125 MPa, in particular 100 MPa, or less—compared to up to 250 MPa as is customary in conventional friction welding, based, for example, on a pairing of two workpieces made of steel. In the claimed friction/current joining, the axial contact pressure in the grinding phase, and optionally in the forging phase, can be, for example, 20-40 MPa. The contact pressure is calculated as the contact pressure per surface area of the contacting joining surfaces of the workpieces.

The lower contact and forging pressure prevents or reduces upturned fiber imperfections in the workpiece material at the joining zone. A short grinding time with reduced contact pressure is also beneficial for this purpose. Furthermore, a homogeneous structure can be achieved. The approach results in advantages for improving and increasing strength, in particular fatigue strength, in the region of the joining zone, and for protection against corrosion. The homogeneous structure is less susceptible to corrosion. Furthermore, rolled-up beads and their corrosion problems can be avoided.

In the claimed friction/current joining, the friction phase included in conventional friction welding, with relative movement of the workpieces subjected to high contact pressure and friction heating of the workpieces, is omitted. The claimed friction/current joining technique achieves significantly lower forces or torques with a significantly lower energy requirement. Flywheels used for inertia friction welding are not necessary. On the one hand, this enables a reduction in the dimensions of the friction/current joining apparatus compared to conventional friction welding machines or, with the dimensions remaining the same, the joining of significantly larger workpieces and larger joining surfaces.

In the claimed friction/current joining technique, the grinding phase at low contact pressure serves to smooth the contacting joining surfaces. Unevenness is eliminated, and the effective contact areas on the contact surfaces are enlarged and evened out. This is favorable for a full-area and uniform flow of current on the contacting joining surfaces, and for a correspondingly uniform heating of the workpieces. The aforementioned low contact pressure and a very short grinding time are sufficient for the grinding process. This can be one second or less, by way of example. Depending on the workpiece and material pairing, it can also be a little longer.

In the grinding phase, it is beneficial not to apply electrical current to the workpieces. Alternatively, a brief and pulsed application of electrical current at low current density is possible. By concentrating current at the tips of uneven regions in the joining surfaces, the removal of these uneven regions can be facilitated. The thermal energy introduced is very low in the cases mentioned. This is advantageous for keeping the drive energy required for the grinding and for the relative movement of the workpieces low. Unevenness on the joining surfaces can be made smooth more easily and more quickly, and friction-increasing adhesion phenomena on the contacting joining surfaces can be avoided or at least significantly reduced.

The plasticization of the workpieces at the joining zone and the formation of the joining connection take place in the claimed friction/current joining technique essentially or only during the forging phase, and due to the effect of the electric current and the conductive heating. The plasticization and the conductive heating are uniform thanks to the aforementioned smoothing in the grinding phase, and can take place over the entire area of the joining surface. The heating not only occurs locally at the joining zone, but extends over a large axial length of the adjacent workpiece regions.

The frictional relative movement of the workpieces on their contacting joining surfaces can be ended after the grinding phase. The longer friction phase that is common in normal friction welding is therefore no longer necessary. The subsequent forging phase can take place at the end or after the end of the frictional relative movement. A frictional relative movement of the workpieces is preferably also dispensed with in the further course of the forging phase.

The application of current to the workpieces and their conductive heating takes place primarily during the forging phase. The application of the electrical voltage and/or the flow of current can take place at the end or after the end of the grinding phase and/or the grinding relative movement. The electrical current can be switched off at the end of the forging phase, and the contact pressure is released at the same time. The current can also be switched off before the end of the forging phase and of the contact pressure.

The workpieces can be moved continuously, rotating and/or oscillating, on their contacting joining surfaces relative to each other in the grinding phase. A rotary movement is particularly favorable for smoothing and for exact and definable adaptation of the joining surfaces. An oscillating relative movement can alternatively or additionally be translational. Furthermore, it is favorable if the contacting movement and the pressure, as well as the forging force, take place along a forging axis or machine axis of a friction/current joining apparatus. The process axis can be the forging axis.

The current source and the current supply to the workpieces being joined or to the apparatus parts connected to the workpieces being joined, in particular the workpiece holders, can be designed in any suitable manner. The current for the conductive electrical heating of the workpieces in the forging phase can enter the circuit in the rest position of the workpieces and/or of the workpiece holders. It can also enter during the grinding phase at low speed, for example.

For the preferably rotating workpiece holder, electrodes are advantageous that can be moved during the stationary state, for example in the form of jaws or permanent electrical sliding contacts—for example, brushes. The other workpiece holder can be permanently connected to the current supply in an electrically conductive manner. To compensate for the axial workpiece feed, the current supply can be equipped with an elastic line, or can be designed to be able to follow in some other way.

A programmable, and also controllable and adjustable, current source is expedient. A current source for direct current with a constant current regulation for exact compliance with the program-controlled electrical process currents is of particular advantage.

In addition, it is advantageous if medium-frequency technology components are used for the current source and the current-carrying parts. Such a medium-frequency technology operating at 1,000 Hz, for example, is standardized and inexpensive. There are also advantages in terms of occupational safety and electromagnetic compatibility, so-called EMC.

The voltages at the current-carrying points, in particular at the electrodes, can be low. They can be in the range of, for example, 5-30 V direct current. This is an advantage for accident prevention and for safety.

A demagnetization device can be provided for any magnetizations that may occur on the friction/current joining apparatus and, if applicable, on the workpieces. This can be designed and act in different ways. During conductive heating with direct current, for example, it can generate an optionally-pulsed demagnetizing current with opposite polarity. The demagnetizing current is a lower current than the heating current, and is sufficient to achieve the coercive field strength of the magnetized material. The demagnetization with, for example, one or a plurality of current pulses can take place during the forging phase.

It is possible if necessary, in addition to the claimed friction/current joining technique, to reheat the workpieces electrically after joining. This can also be done by conductive heating, and/or alternatively or additionally by inductive heating. Electrical preheating before joining is also possible, but less desirable.

Particular advantages of the claimed friction/current joining technique relate to the homogeneity and the uniform flow of current as well as the uniform heating of the applied joining surfaces during conductive heating. The uniform heating over the surface or the diameter leads to a corresponding uniformity of strength and hardness. Further advantages relate to workpieces with a plurality of joining surfaces, which can be joined particularly advantageously by friction current. In rotary friction welding, due to the movement, the heating is not uniform. It is greater at the outer edge of the workpiece than in the inner region.

In addition, workpieces made of the same or different electrically conductive materials can advantageously be joined by friction current. These can be, for example, different metals or other identical or different material combinations, for example steel with an iron-containing cast material. The conductive heating saves a great deal of process time and workpiece material compared to conventional friction welding technology. In addition, the structural properties can be significantly improved. In the friction/current joining of workpieces with different thicknesses, special advantages result at the joining surfaces, in particular with relatively thin-walled pipes.

Another benefit of the claimed friction/current joining technique is based on reducing the axial heat dissipation from the joining zone. In conventional friction welding, the axial temperature gradient and heat dissipation are high. Thanks to the uniform conductive heating, this can be significantly reduced with friction/current joining. The unfavorable structural changes of, in particular, metallic workpieces associated with a strong temperature gradient can be avoided or at least significantly reduced with friction/current joining.

With friction/current joining, the uniform conductive electrical heating introduces sufficient heat into the workpieces and the resulting joined part, which is advantageous for the stable and manageable joining process that can be adapted to special material requirements, in particular structural specifications. In addition, any bead at the joining zone can be removed more easily and with improved qualitative results.

With the claimed friction/current joining technique, difficult workpiece materials, in particular chromium-containing and/or manganese-containing steels or the like, can also be joined safely and reliably, even if they are normally not possible to weld, or can only be welded with great difficulty. This applies in particular to steels containing chromium, such as 102 Cr 6 and the like. Other critical materials—for example, brittle, in particular cold-brittle, sintered materials, and also cast materials, as well as material combinations which are unequal and problematic with regard to thermal behavior—can also be connected well and at high quality with friction and current. Light metals can also be frictionally joined to each other.

Another particular advantage is the already mentioned prevention or reduction of hardening in the material structure at the joining zone. With the claimed friction/current joining, viscoplastic and ductile joining and connection regions on the joined part can be achieved. Even critical materials, such as chromium-containing steels, show flexurally elastic properties at the joint area, in contrast to the embrittlement and loss of ductility that are common in conventional friction welding. By making the material structure more uniform at the joining region with friction/current joining, internal notch stresses and the resulting sensitivity to corrosion are also avoided, or at least significantly reduced.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

The invention relates to a method and to an apparatus (1) for joining using friction and current of two or more workpieces (2, 3). The invention also relates to a joined part (6) produced from the workpieces (2, 3) using the claimed method.

The workpieces (2, 3) can consist of the same or different electrically conductive materials. In particular, they can be formed from the same or different metals. These can be, for example, iron-containing steels or cast materials, titanium or nickel-based alloys, or the like. In particular, one or more workpieces (2, 3) can consist of steels containing chromium and possibly manganese, for example 102 Cr 6, which are critical for welding.

The workpieces (2, 3) can have different shapes and, in particular, cross-sectional shapes. They can be designed as hollow bodies, in particular as tubes, or made of solid material. The workpieces (2, 3) have mutually facing joining surfaces (4, 5), in particular end faces, on which the joining connection is made. One or more joining surfaces (4, 5) can be arranged on each work piece (2, 3). Elongated workpiece shapes are favorable.

Figure 1:
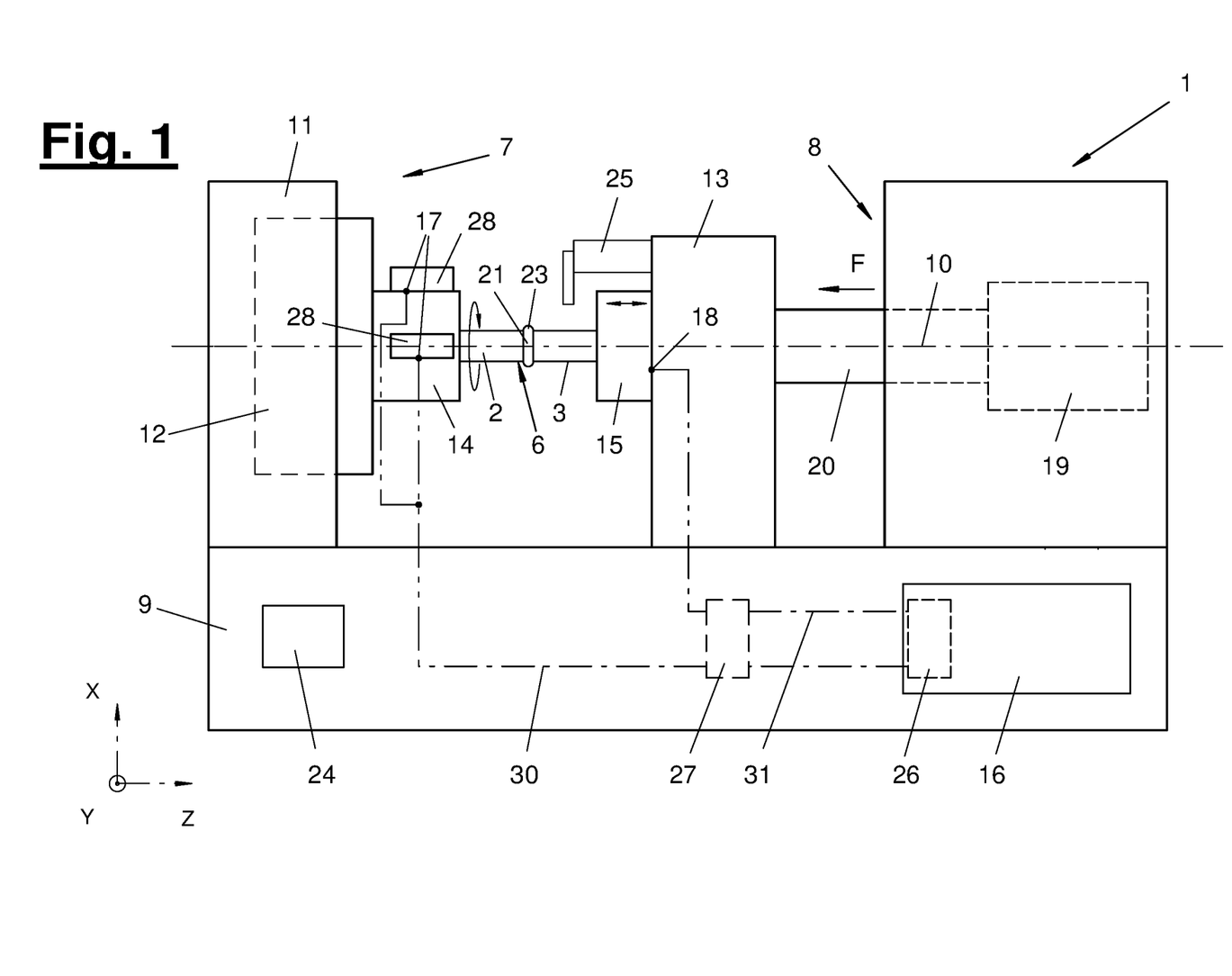
FIG. 1 depicts a friction/current joining apparatus in a schematic side view.

In the embodiment shown, two workpieces (2, 3) are joined to each other with friction and current. The friction/current joining apparatus (1) used for this can be designed, for example, as a so-called single-head machine. Alternatively, it is possible to join three or more workpieces (2, 3) in one set-up at the same time, or one after the other. A so-called double-head machine or a double single-head machine, for example, can be used for this purpose. In FIG. 1, the workpieces (2, 3) are shown in the already joined state as a joined part (6).

The friction/current joining apparatus (1) shown in FIG. 1 has a friction device (7) and a forging device (8), as well as a machine frame (9) and an electrical current source (16). The machine frame (9) is designed, for example, as a machine bed on which the friction device (7) and the forging device (8) are arranged. The electrical current source (16) can be accommodated in or on the machine frame (9), in particular the machine bed.

With the friction device (7), the workpieces (2, 3) being joined can be moved relative to each other in the manner explained below, subjected to contact pressure and in frictional contact. With the forging device (8), mutual infeed and contacting of the workpieces (2, 3) can take place. In addition, the contact pressure of the contacting workpieces (2, 3) used for joining using friction and current can be applied therewith. Said infeed and the application of the contact force or the contact pressure can take place along a preferably horizontal axis (10). This can be a so-called machine axis or process axis, and/or a joining axis or forging axis. In the embodiment shown, the joining surfaces (4, 5) are aligned perpendicular to the axis (10).

The friction/current joining apparatus (1) has workpiece holders (14, 15) for holding one or more workpieces (2, 3) being joined. The workpiece holders (14, 15) are designed, for example, as manually or mechanically operated chucks. These can in particular be so-called center clamping vices.

Figure 2:
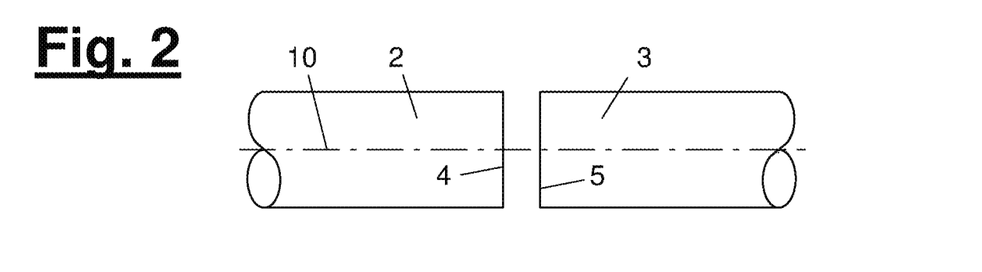
FIGS. 2 to 5 illustrate a sequence of the joining process on two workpieces in several steps.

The forging device (8) brings the workpieces (2, 3) to be joined from an initially remote loading position, as shown in FIG. 2, into mutual contact on their joining surfaces (4, 5), and generates a controllable and preferably adjustable contact force (F). This acts, for example, in the direction of the axis (10). The magnitude of the contact force (F) can depend on the size of the surfaces being joined (4, 5), and the contact pressure acting there. In the embodiment, the contact pressure is approximately 25 MPa.

The workpieces (2, 3) in contact are moved, in particular rotated, relative to each other by the friction device (7).

During the relative movement, one or more of the workpieces (2, 3) being joined are moved. In the embodiment shown, the left workpiece (2) is moved relative to the right workpiece (3). One workpiece holder (14) for the workpiece (2) is movable, and the other workpiece holder (15) for the workpiece (3) is stationary. The relative movement is a rotating movement around the preferably central axis (10). This is also the central longitudinal axis of the workpieces (2, 3), for example. The rotary movement can be revolving or reversing or oscillating. This relative movement can begin before or when contact is made. The relative movement can also take place transverse to the axis (10). Said transverse orientation includes right-angled and oblique orientations.

The friction device (7) has a machine head (11) with a drive (12) for the associated workpiece holder (14). In the case of the rotating relative movement, this can be a spindle drive with which a spindle, which is coupled to the workpiece holder in a rotationally fixed manner, is driven to rotate about the axis (10). The machine head (11) can be arranged rigidly or movably on the machine frame (9). In particular, it can be mounted on the machine frame (9) so that it can be displaced or moved along the axis (10) and, if necessary, can be locked.

The other workpiece holder (15) is arranged on a counter-holder (13), which can also be arranged rigidly or movably, in particular movable along the axis (10) and, if necessary, lockable on the machine frame (9). The counter holder (13) can be designed, for example, as a slide with a clamping or indexing device.

In the embodiment shown, the counter holder (13) is advanced by the forging device (8) to the machine head (11) and to the workpiece (2) held there. This is a linear infeed movement, symbolized by arrows. The forging device (8) has a forging drive (19) for this purpose. In the embodiment shown, this can be, for example, a fluidic, preferably hydraulic, cylinder or a motor drive with an electric motor or a hydraulic motor. In the embodiment shown, the forging drive develops compressive forces (F) and, with an output element (20), such as a piston rod, pushes the workpiece holder (15) and the counter holder (13) towards the machine head (11). For this purpose, the forging drive (19) is arranged and supported in a stationary manner on the machine frame (9), at least for the infeed function. The forging force and the forging pressure, as well as the infeed process, act along the axis (10).

In another embodiment, not shown, a forging drive can be arranged on the machine head (12). It can, for example, develop tensile forces and can pull the counter holder (13) along the axis (10) towards the machine head (11).

The current source (16) is connected in an electrically conductive manner to the workpieces (2, 3) via current connections (17, 18). The current connections (17, 18) can be designed in any suitable manner. The current connections (17, 18) can be connected to the workpieces (2, 3) directly or indirectly, for example via the work piece receptacles (14, 15), in an electrically conductive manner.

One current connection (18) is arranged on the, for example, electrically conductive, in particular metallic, workpiece holder (15) of the counter holder (13). This is, for example, non-rotatably arranged and is moved axially by the forging drive (19). The other current connection (17) is arranged on the, for example, moving and also electrically conductive, in particular metallic, workpiece holder (14) of the machine head (11).

The current connections (17, 18) can each have one or more electrodes (28, 28', 29, 29'). These can be designed differently from each other. The current connection (17) on the moving workpiece holder (14) can, for example, have a plurality of electrodes (28) in the form of slip ring transmitters or the like, which are arranged on the circumference of the workpiece holder (14), rotating around the axis (10) and at least partially circular. The electrodes (28) or slip ring transmitters are connected in an electrically conductive manner to the current source (16) via one or more lines (30) and to the workpiece holder (14) via slip rings, brushes or the like.

The current connection (18) on the workpiece holder (15) of the counter holder (13) can be connected in an electrically conductive manner to the optionally movable clamping elements of the workpiece holder (15). The clamping elements can, for example, form the electrode(s) (29). The current connection (18) is connected to the current source (16) via one or more lines (32).

The electrical current source (16) can be designed in any suitable manner. It has a programmable controller (24). The current source (16) can be connected on the input side to a current supply, in particular to a local alternating current network. On the output side, it emits a current, preferably direct current, to the workpieces (2, 3) via the current connections (17, 18). The electric current flows through the contacting workpieces (2, 3) in the direction of the axis (10), and conductively heats them.

The current source (16) is designed as a programmable and controllable, and preferably adjustable current source, in particular a direct current source. It has a constant current controller with which the controlled currents can be kept constant. The current source (16) can be controlled via one or more current programs. It works with low voltages of, for example, approx. 10 V. The current source (16) works, for example, with medium frequency technology of, for example, 1,000 Hz. The current delivered can be 100 kA or more. The current output depends on the size of the joining surfaces (4, 5). The current density can be, for example, 25 to 35 A/mm² or less.

Figure 7:
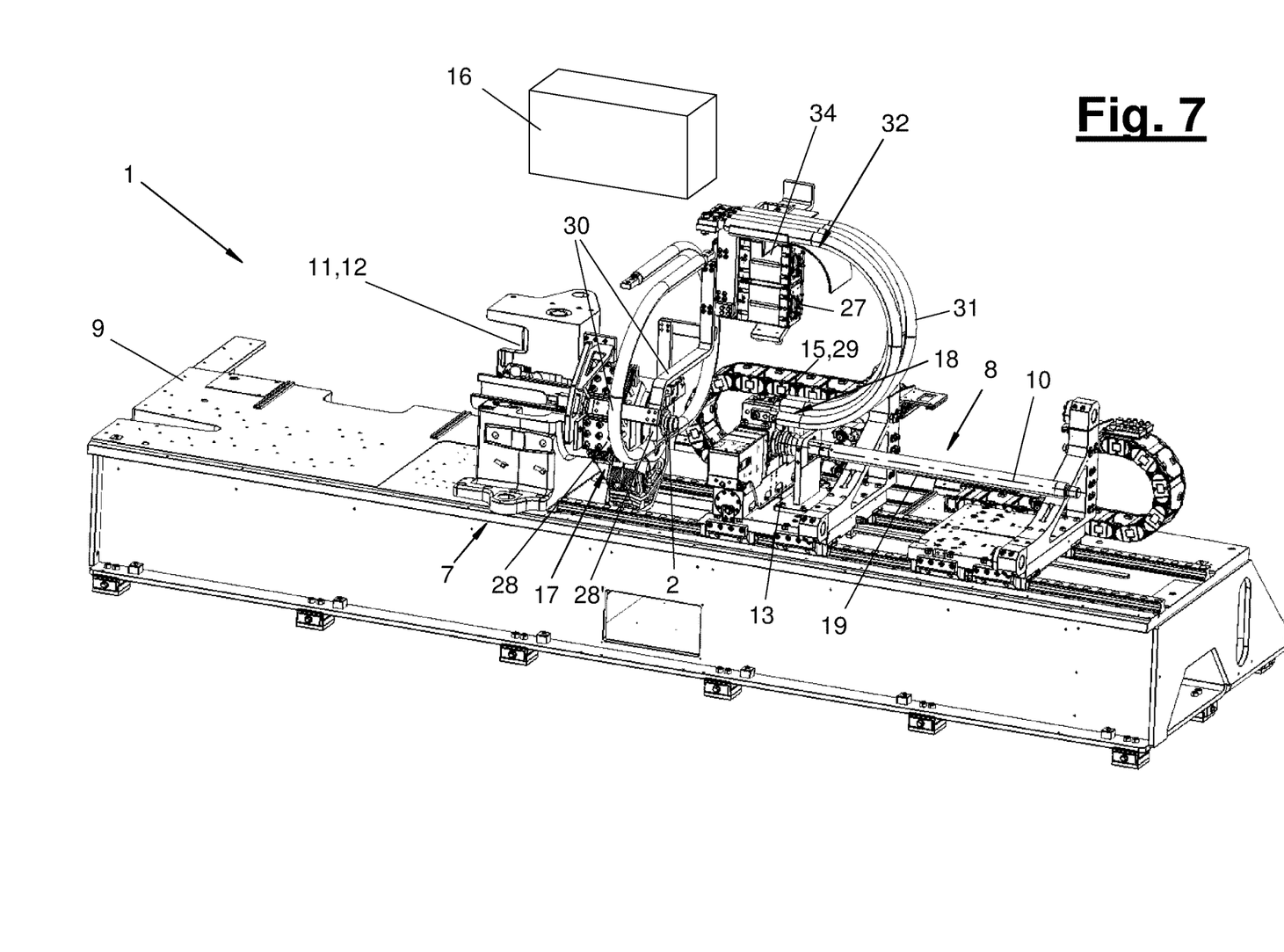
FIGS. 7 to 10 depict an exemplary a current supply and its parts in different views, and FIGS. 11 and 12 schematically illustrate an exemplary degaussing device in two variants.

The current source (16) can have one or more controllable or adjustable electrical converters (26) which, for example, output a preferably constant alternating current with a frequency of 1,000 Hz, for example. The current source (16) can also have one or more electrical transformers (27) in addition to, for example, integrated rectifiers, which can optionally be arranged closer to the workpieces (2, 3). FIGS. 1 and 7 show this arrangement.

The friction/current joining apparatus (1) can have a detection device (25) for the detection of physical parameters in the joining process on one or more workpieces (2, 3), or at another location. The detection device (25) can contain one or more sensors for one or more physical parameters. In the embodiment shown, the detection device (25) detects the temperature, by way of example, directly on one or both workpieces (2, 3) in the joining process.

Alternatively or additionally, voltage U and current I can be detected in the process, and the electrical resistance R can be derived from this as a process variable. The resistance R can also be detected in other ways. The electrical resistance R allows a direct conclusion about the mean temperature or the amount of heat applied. This can be used for in-process monitoring. On the other hand, when grinding at low current density, the resistor R can be triggered in order to automatically control the duration or the end of the grinding.

In the case of metallic workpieces, the transformation and phase behavior of the material, and the structure formation depend on the temperature and possibly on the change in temperature, in particular on the cooling rate. The heating and, in particular, cooling of the materials being joined and the desired phase and structure formation caused by the conductive heat can be precisely controlled and adjusted as required via the detected temperature and its change in magnitude and change over time. The sensor system for temperature detection can be designed in any suitable manner, for example as an infrared sensor, thermal imaging camera or the like.

The detection device (25), which is only shown schematically, can have one or more additional sensors. This can be, for example, a distance meter for detecting a workpiece shortening during the friction/current joining, a travel of the counter holder, (13) or the like. Other sensors can detect, for example, surface properties of the workpieces (2, 3) being joined, the position, orientation and size of a heating region (22) on the workpieces (2, 3), a pressure on the joining surfaces (4, 5), workpiece deformation, in particular the formation of a bead (23) at the joining zone (21), or the like.

FIGS. 2 to 5 illustrate an exemplary sequence of the friction/current joining process in several steps. In FIG. 6, the curves of the contact pressure (p), the electrical current (I) and the speed (v) of the relative movement, in particular the rotational speed or rotary speed of the rotating workpiece holder (14) occurring during the friction/current joining process, are shown in an abbreviated diagram (t) as a function of time. A contacting phase (a), a grinding phase (b) and a forging phase (c) are also shown. The phase transitions are marked with I and II, and the end of the forging phase (c) is marked with III.

The graphs shown for (p), (I) and (v) can vary. In particular, the magnitude and the profile of the current (I) can be changed for targeted control and, if necessary, regulation of the temperature and of the structure formation on the workpieces (2, 3). This can be done, for example, by means of a current program.

FIG. 2 shows the starting position or loading position in which the workpieces (2, 3) are inserted into their respective workpiece receptacles (14, 15), and are spaced from each other in the direction of the axis (10). The workpieces (2, 3) are then brought into physical contact at their end-face joining surfaces (4, 5). The workpiece (3) is advanced along the axis (10) by the forging device (8), and a contact force (F) is applied to it when the workpieces are in contact. The so-called contacting phase (a) is shown in FIG. 2. A calibration phase mentioned at the beginning can take place beforehand. A distance measurement is carried out during the advancing movement. The friction/current joining process can be operated with a path control or path regulation of the advancing movement, and with a length control based on this for the shortening of the workpiece.

Figure 3:
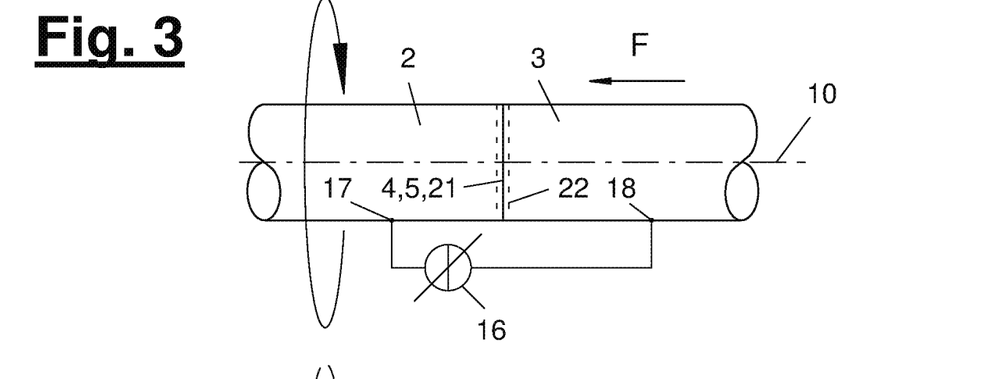

In this contact position, the rotating frictional relative movement symbolized by an arrow is started. FIG. 3 shows this grinding phase (b) and its beginning I.

The workpiece (2) is rotated by the spindle drive (12) about the axis (10), relative to the stationary or fixed workpiece (3). In this case, an initially lower axial contact pressure (p) is applied, in accordance with FIG. 6. The rotational movement can be started when the workpieces (2, 3) are in contact, or beforehand. FIG. 6 shows the start beforehand.

In the grinding phase (b), the current source (16) is switched off, by way of example. During the grinding, the end-face joining surfaces (4, 5) are made smooth in the frictional contact, with unevenness being removed and the joining surfaces (4, 5) being made smooth and mutually adapted to each other.

The duration of the grinding phase (b) is very short. It is, by way of example, 1 second or less. In the grinding phase (b), little heat is generated in the joining zone (21) where the joining surfaces (4, 5) contact each other. The heating region (22) shown in dashed lines is small when viewed in the axial direction.

FIG. 6 illustrates a variant in the griding phase (b), in which the current source (16) is switched on and emits one or more short-term current pulses. Such a current pulse is shown in dashed lines in FIG. 6.

Figure 4:
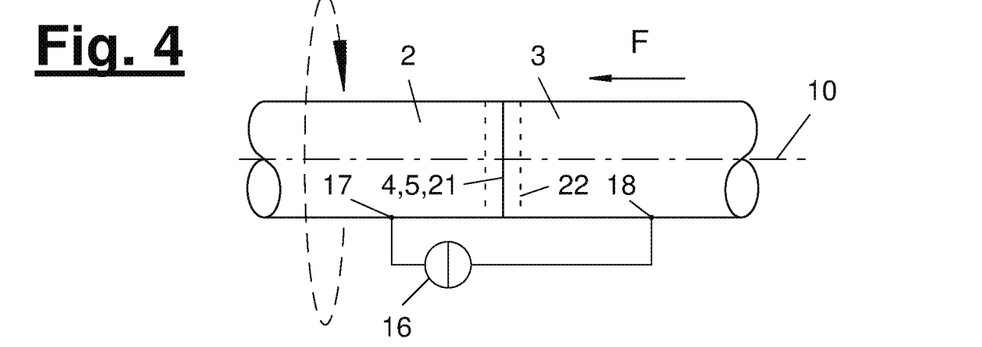
Figure 5:
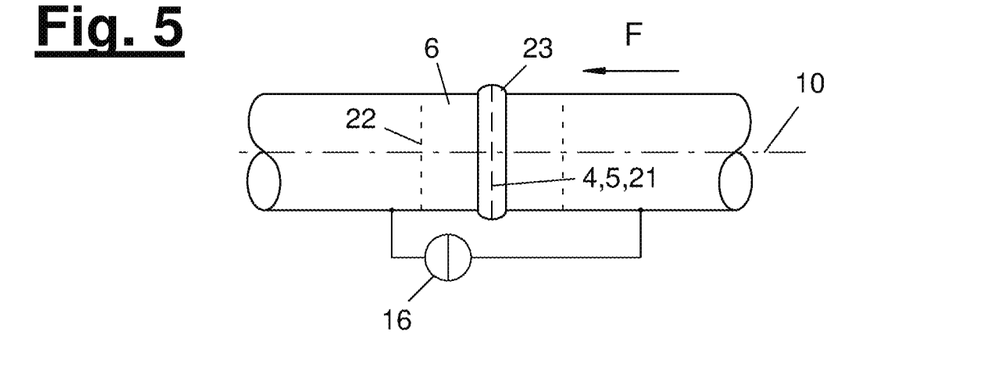
Figure 6:
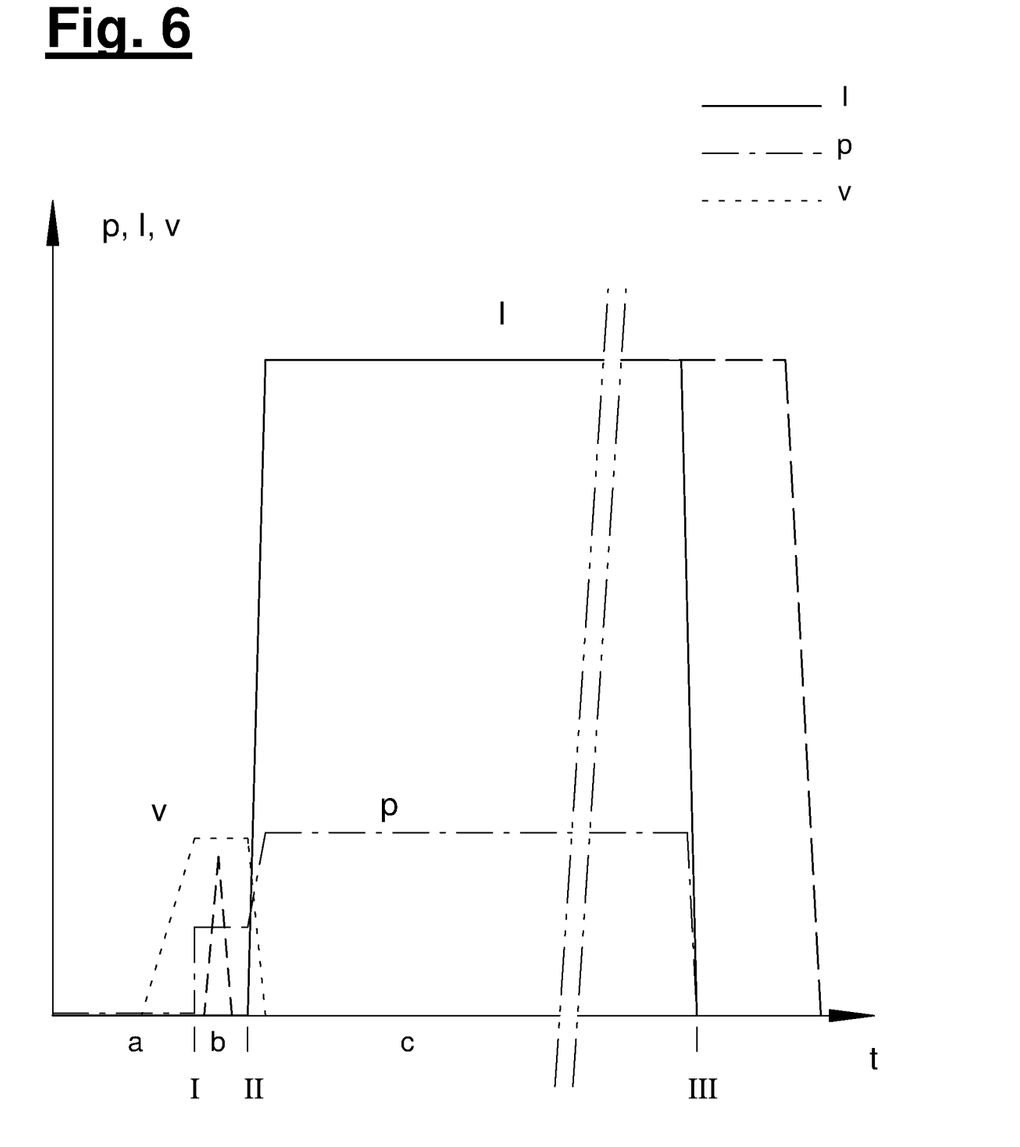
FIG. 6 is a schematic diagram with profiles of contact pressure, relative speed of movement, and electrical current over time.

FIGS. 4 and 5 illustrate the immediately subsequent forging phase (c). At the end of the grinding phase (b), the relative movement of the workpieces (2, 3) is ended, in accordance with FIG. 4. This is symbolized by the dashed movement arrow. The workpieces (2, 3) remain in their relative position assumed at the end of the grinding phase (b), for example according to FIG. 5, in the further course of the forging phase (c). In this fixed relative position, the workpieces (2, 3) can be positioned in a defined rotational position with respect to each other.

During the deceleration phase or starting from and/or after the workpieces (2, 3)—still in contact—come to a stop, the contact force (F) and the contact pressure acting on the joining surfaces (4, 5) are kept the same or increased. FIG. 6 shows this behavior at the point and/or at time II.

In the grinding phase (b), the contact pressure (p) shown in FIG. 6 was low and was, for example, approximately 25 MPa. In the forging phase (c), the contact pressure (p) is essentially left at this value. Alternatively, it can be increased to the aforementioned 125 MPa, or preferably 100 MPa or even less.

The contact pressure (p) can be kept constant during the forging phase (c). Alternatively, it can vary, for example rise or fall in a ramp-like or step-like manner, or also fluctuate around a constant or variable mean value. The forging phase (c) takes longer than the grinding phase (b). The duration can be 1-4 seconds, for example.

FIG. 5 shows the final state of the forging phase (c), in which the workpieces (2, 3) are joined and form a connected joined part (6), which can possibly have a ring-like bead (23) at the joining zone (21). FIGS. 4 and 5 also illustrate the axial growth and widening of the heating region (22) during conductive heating.

At the beginning II of the forging phase (c), the electric current (I) shown in FIG. 6 with solid lines is switched on, for example, and results in the conductive heating.

In the variant with a preceding current pulse in the grinding phase (b), it can also be increased significantly at the start II of the forging phase (c).

The current (I) can be switched on, for example, in the deceleration phase of the relative movement, with falling speed (v), or when the contacting workpieces (2, 3) are at a standstill. The electrical current (I) can be switched on immediately at standstill or, if necessary, with an adjustable time delay.

The electrical current (I) remains switched on during the forging phase (c). It can be constant during the forging phase (c), in accordance with FIG. 6. Alternatively, it can vary. The variations can be ramp-like or step-like, rising or falling, or also fluctuating around a constant or variable mean value. Any variations in the profile of the contact pressure (p) and the current (I) can be adapted to each other.

The variations in the profile of the current (I) and optionally the contact pressure (p) can be controlled and, if necessary, adjusted by the controller as a function of the signals or detected values of the detection device (25). In this way, for example, the conductive heating can be adapted to the transformation and phase behavior of materials, in particular metals, in order, for example, to achieve a desired structure.

The plasticizing heating and joining of the workpieces (2, 3) subjected to contact pressure is completely or predominantly caused by the conductive electrical heating in the forging phase (c).

At the end of III of the forging phase (c), the forging device (8) and the current source (16) are switched off. The current (I) can be switched off at the same time as the contact pressure (p), or shortly beforehand. The current (I) remains switched on for at least the greater part of the duration of the forging phase (c). The duration of the forging phase (c) is determined by the duration of the contact pressure (p).

The workpieces (2, 3) or the joined part (6) joined in the forging phase (c) according to FIG. 5 can be removed after the workpiece holders (14, 15) have been opened. The workpiece holder (14) can then be moved back into the starting or loading position illustrated in FIG. 2 for repeated loading.

The friction/current joining process described above can be expanded at the end and/or at the beginning. At the beginning, an electrical preheating of the still-unjoined workpieces (2, 3) can be added upstream. This can be done conductively or inductively.

At the end, an electrical reheating process can be added. This can also be done conductively or inductively. In the diagram of FIG. 6, an extended switch-on duration of the current (I) is shown in dashed lines for this purpose.

Figure 8:
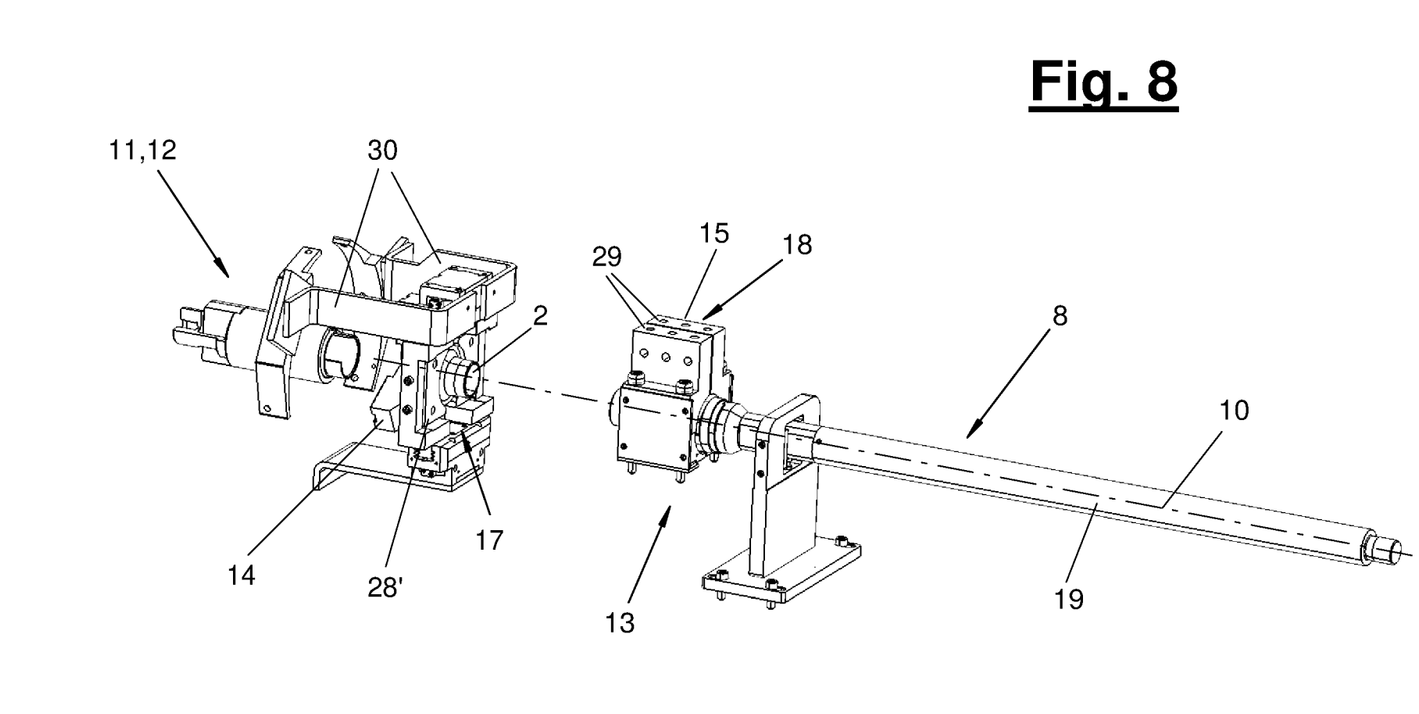

FIG. 7 shows a structural embodiment of the friction/current joining apparatus (1) of FIG. 1. The friction/current joining apparatus (1) has a friction device (7), a pressing device (8), a machine frame (9) and a controllable and, optionally, adjustable current source (16), along with current connections (17, 18) and a current supply for applying the electric current for conductive heating of the workpieces (2, 3) to the workpieces (2, 3) held in the workpiece holders (14, 15). In FIG. 8, the current connections (17, 18) and the current supply are shown separately.

FIG. 7 also shows a demagnetization device (32) with which the components of the friction/current joining apparatus (1) subjected to current and, if applicable, the workpieces (2, 3), in particular the joined part (6), can be demagnetized.

In FIG. 7, the current source (16) is shown schematically. The converter or converters (26) of the welding current source (16) are not shown. FIG. 7 shows the arrangement of a transformer (27) which is connected to the connection points (17, 18) via lines (30, 31). The transformer (27) is arranged in the vicinity and, for example, above the workpieces (2, 3). It can be connected to, for example, a slide-like adjusting device, and removed if necessary.

The transformer (27) is connected to the current connections (17, 18) via the aforementioned lines (30, 31). The lines (30, 31) can be rigid or flexible. The line (31) from the transformer (27) to the current connection (18) is movable, for example, and can follow the axial and forging movement of the counter holder (13) and its workpiece holder (15) along the process axis or machine axis (10). This line (31) is designed, for example, as a bundle of a plurality of flexible current cables laid in a bend and enclosed in a cooling jacket. The line (30) leading from the transformer (27) to the current connection (17) can be rigid and, for example, in the form of current bars. Alternatively or additionally, it can be designed to be flexible and in the form of current cables of the aforementioned type.

In FIG. 7, two variants of electrodes (28, 28') on the current connection (17) and on the moving workpiece holder (14) assigned to the machine head (11) are shown in a drawing. In practice, only one variant is usually used. FIG. 8 shows one of the variants in a separate illustration.

FIG. 7 shows a design of the one or more electrodes (28) as slip ring transmitters or brush transmitters. If necessary, the electrodes (28) can transmit the current to the rotating workpiece holder (14). The preferably multiple electrodes (28) are arranged distributed on the outside on the cylindrical circumference of the workpiece holder (14), and make contact with its shell. Within the workpiece holder (14), there can be flexible line pieces which establish a connection to the chuck jaws, which can be moved radially, for example. The electrodes (28) can be movable to be positioned against the workpiece holder (14).

FIGS. 7 and 8 also show an electrode variant with one or more, preferably two, electrodes (28') which can be advanced directly to the workpiece (2) held in the tool holder (14), preferably when it is at a standstill, and brought into current-conducting contact. These jaw-shaped electrodes (28') are arranged in front of the tool holder (14). They are connected to the transformer (27) via flexible lines (30).

Figure 9:
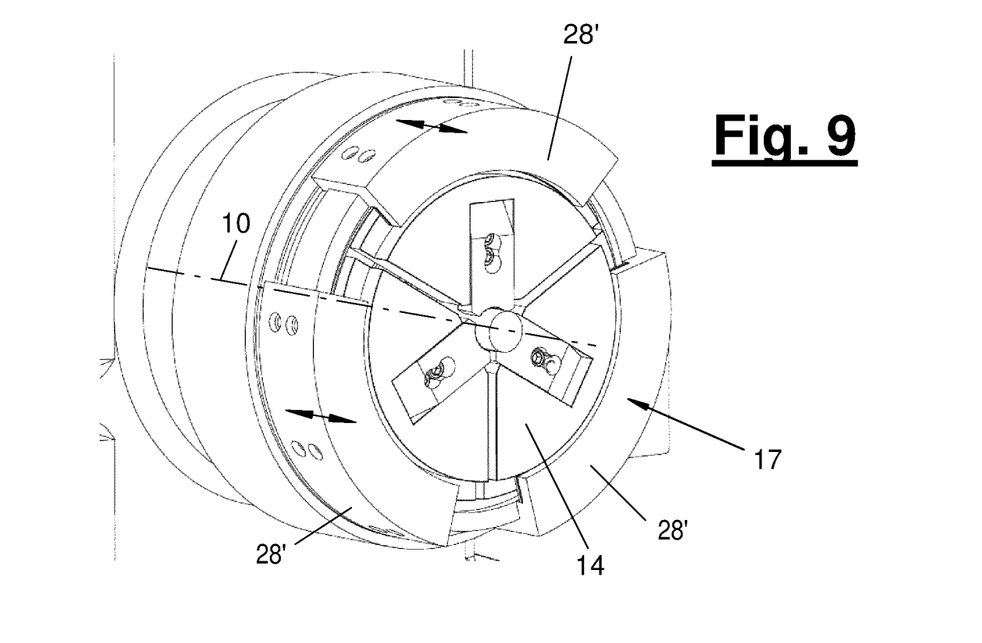

FIG. 9 shows a further possible electrode variant. In this case, the electrodes (28') are designed as axially movable jaws which can be placed axially against the workpiece holder (14) in the direction of the process axis (10) via an adjusting device (not shown) and brought into current-conducting contact. The placement can take place, for example, axially from the front or, alternatively, from the front and rear in the case of a floating infeed.

The electrodes or jaws (28') are designed, for example, as edged ring portions, and can be brought into contact with the outer end-face edge and the adjacent peripheral region of the workpiece holder (14). This electrode shape is particularly suitable for applying current when the workpiece holder (14) and the workpiece (2) are at a standstill.

FIGS. 7 and 8 show a current connection (18) on the workpiece holder (15) of the counter holder (13). The workpiece holder (15) comprises, for example, multiple, in particular two, movable clamping jaws which can be advanced to the workpiece (3), which form electrodes (29) and are connected to the flexible line (31).

Figure 10:
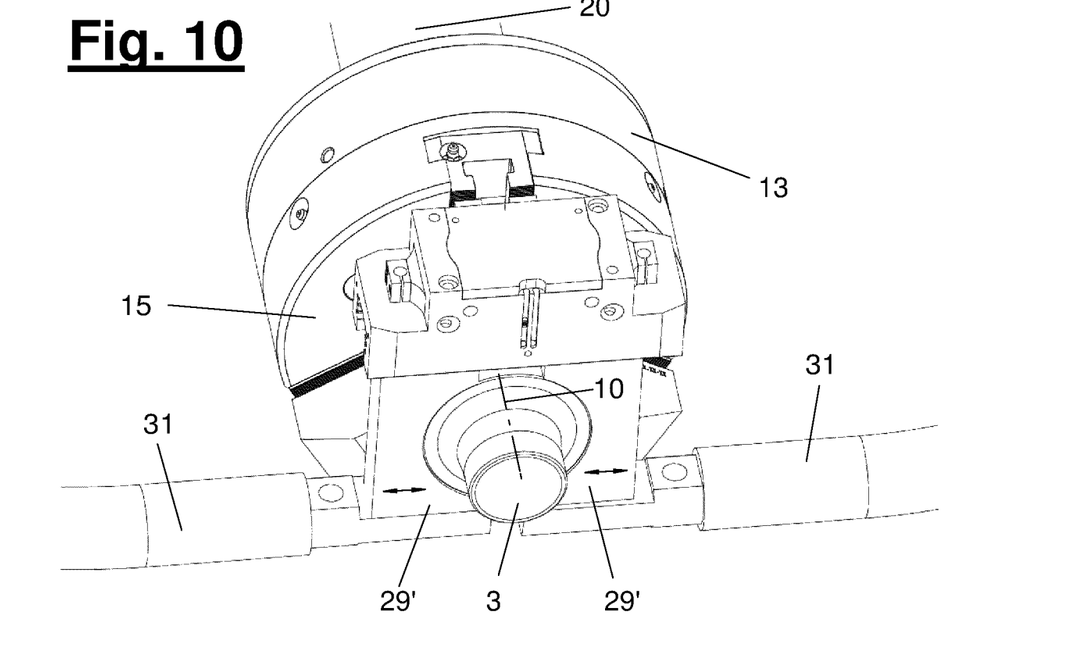

FIG. 10 shows a variant of this in which the current connection (18) is arranged on the workpiece (3), which is held by the workpiece holder (15) on the counter holder (13). For this purpose, one or more, in particular two, jaw-shaped electrodes (29') are provided, which can be fed to the workpiece (3) with their own adjusting drive, and brought into electrical contact. The electrodes (29') are connected to the transformer (27) via preferably flexible lines (31).

The degaussing device (32) can be designed in different ways. In the case of electrical conductive heating of the contacted workpieces (2, 3) by means of direct current, an electrical design of the demagnetization device (32) that generates a demagnetization current with reversed polarity is recommended. The current strength of the demagnetizing current is sufficient to achieve the required coercive force to demagnetize the exposed parts. The demagnetizing current can be emitted in the form of one or more current pulses. The demagnetization can take place during the forging phase (c), in particular at the end thereof.

Figure 11:
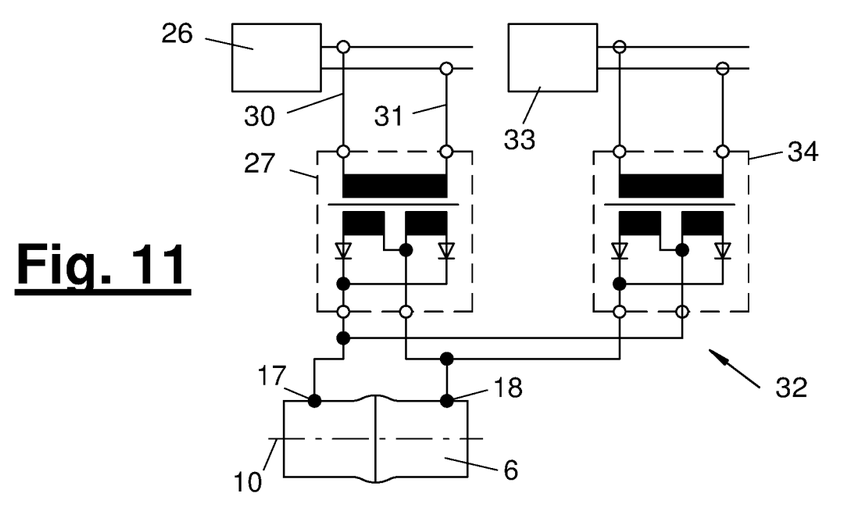
Figure 12:
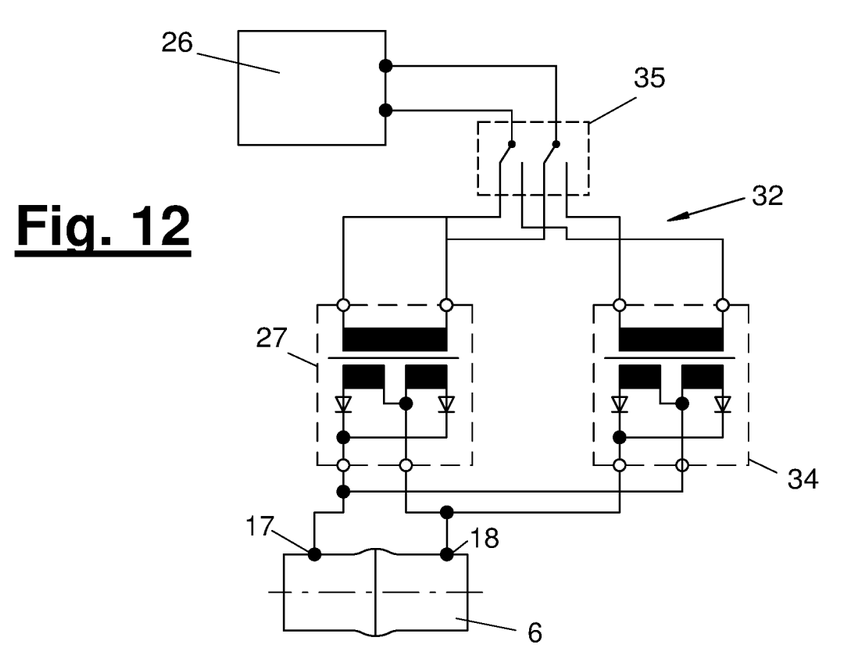

FIGS. 11 and 12 show exemplary circuit diagrams for such an electrical demagnetization device (32).

In the variant of FIG. 11, the demagnetization device (32) has its own converter (33) and its own transformer (34), which are connected via lines to the current connections (17, 18) and deliver a direct current. Its polarity is opposite to the polarity of the conductive heating current, which is generated by means of the converter (26) and the associated transformer (27). The current connections (17, 18) can be located on the workpieces or on the joined part (6) and/or on the workpiece holders (14, 15). The converter (33) can be connected to the electrical network. It can be controlled or adjusted independently. Adjustment is possible, for example, by means of a detection device (not shown) which detects the degree of magnetization of the affected components of the friction/current joining apparatus (1), and optionally the workpieces (2, 3) and/or the joined part (6).

FIG. 12 shows a further embodiment which functions with only one converter (26), the demagnetization device (32) having its own transformer (34) and a switch (35) on the primary side, for example. The converter (26) for the electrical conductive heating is connected to the transformer (27) and to the current connections (17, 18) via the switch (35). The switch (35) switches over for demagnetization and establishes an electrical connection between the converter (26) and the other transformer (34), and the current connections (17, 18) with reversed polarity.

In a variant not shown, the switch (35) can be arranged on the secondary side. In this case, the converter (26) and transformer (27) provided for the electrical conductive heating are sufficient, the secondary switch being arranged between the transformer (27) and the current connections (17, 18). For demagnetization, it switches the polarity of the direct current transmitted to the joined part (6).

FIGS. 11 and 12 also illustrate, in a schematic representation, the exemplary design of transformers (27, 34) with an integrated rectifier. The rectifier or rectifiers can alternatively be designed and arranged differently.

In a further embodiment variant, which is not shown, the demagnetization can take place by mechanical movement, in particular vibration, by heat treatment, or alternatively by alternating current—or also by a combination of different procedures. In addition, there are further possibilities, for example the temporary application of a permanent magnetic field or the like.

Modifications of the embodiments shown and described are possible in various ways. The features of the various embodiments and the variants mentioned can be combined with each other, in particular also interchanged.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 friction/current joining apparatus
2 workpiece
3 workpiece
4 joining surface, end face
5 joining surface, end face
6 joining part, joined part, finished part
7 friction device
8 forging device
9 machine frame
10 process axis, machine axis
11 machine head
  12 drive, spindle drive
13 counter holder
14 workpiece holder, chuck
15 workpiece holder, chuck
16 current source
17 current connection
18 current connection
19 forging drive, cylinder
20 output element, piston rod
21 joining zone
22 heating region
23 bead
24 controller
25 detection device
26 converter
27 transformer
28 electrode, slip ring
28' electrode, jaw
29 electrode
29' electrode, jaw
30 line
31 line
32 demagnetizing device
33 converter
34 transformer
35 switch
P contact pressure
v speed
l electric current
a contacting phase
b grinding phase
c forging phase

What is claimed is:

1. A method for joining, using friction and current, two or more workpieces by grinding and by conductive heating with electrical current, the method comprising:
    in a contacting phase, moving the workpieces along a process axis such that respective joining surfaces of the workpieces facing each other and oriented transverse to the process axis are brought into contact;
    prior to or beginning with the contact of the joining surfaces, rotating the workpieces relative to each other in directions transverse to the process axis or about the process axis;
    in a grinding phase that begins with the contact of the joining surfaces, grinding the workpieces against each other, subjected to contact pressure, due to the mutual relative movement at the joining surfaces such that the joining surfaces are made smooth without plasticizing the workpieces;
    at the end of the grinding phase, stopping the relative grinding movement of the workpieces; and
    in a forging phase directly following the grinding phase, forging, plasticizing, and joining the workpieces at their contacting joining surfaces, subjected to contact pressure along the process axis and subjected to immediate and continuous conductive heating by electric current without frictional relative movement of the workpieces.

2. The method of claim 1, wherein the plasticizing, heating and joining of the workpieces subjected to contact pressure is effected at least primarily by the conductive electrical heating in the forging phase.

3. The method of claim 1, wherein the grinding phase is performed substantially without subjecting the workpieces to pulsed electrical current.

4. The method of claim 1, further comprising:
subjecting the workpieces to electrical current density in the grinding phase, wherein the electrical current density is selected to facilitate removal of uneven regions of the joining surfaces without adhesion; and
subjecting the workpieces to increased electrical current density in the forging phase, compared to the current density in the grinding phase.

5. The method of claim 1, further comprising subjecting the workpieces to an adjusted, constant direct current.

6. The method of claim 1, wherein the workpieces are subjected to a current density of between about 30 to 50 A/mm$^2$ in the forging phase.

7. The method of claim 1, wherein:
the workpieces are subjected to the electrical current only at the end of the grinding phase; or
the workpieces are subjected to the electrical current only after the end of the grinding phase and the frictional relative movement.

8. The method of claim 1, wherein the workpieces are subjected to the electrical current when they are at a standstill following the grinding phase.

9. The method of claim 1, wherein, the workpieces are subjected, on the joining surfaces, to a contact pressure equivalent to the contact pressure during the grinding phase and the forging phase.

10. The method of claim 1, wherein the workpieces are pressed together with a contact pressure of 125 MPa or less.

11. The method of claim 1, further comprising:
detecting one or more physical parameters associated with the workpieces during the joining process; and
controlling at least one of the contacting, grinding, or forging phases according to the one or more detected physical parameters.

12. The method of claim 1, further comprising at least one of:
electrically preheating the workpieces before joining the workpieces; or
electrically reheating the workpieces after joining the workpieces.

13. The method of claim 1, further comprising one of:
demagnetizing an apparatus used for friction and current joining the workpieces; or
demagnetizing an apparatus used for friction and current joining the workpieces and demagnetizing the workpieces.

14. The method of claim 13, wherein the demagnetization takes place with a direct-current demagnetization having a reverse polarity relative to the heating current for conductive heating.

15. The method of claim 14, wherein the direct- current demagnetization is pulsed.

16. An apparatus for joining, using friction and current, two or more workpieces by grinding and by conductive heating with electrical current, the apparatus comprising:
workpiece holders for supporting the workpieces to be joined;
a friction device;
a forging device;
an electrical current source; and
a programmable controller having programming code designed to control the friction device, the forging device, and the electrical current source to carry out the method of claim 1.

17. The apparatus of claim 16, wherein:
the electrical current source is programmable, and is connected to the workpieces in an electrically conductive manner via current connections;
the current connections are arranged on at least one of the workpieces or the workpiece holders; and
each current connection has one or more electrodes.

18. The apparatus of claim 16, wherein:
the electrical current source is designed as a direct-current current source with a constant current control for exact compliance with program-controlled electrical process currents; and
the electrical current source comprises a controllable or adjustable electrical converter.

19. The apparatus of claim 16, wherein the forging device is designed to bring the workpieces being joined from an initially distant loading position along the process axis into mutual contact at their joining surfaces, and to generate a controllable contact force.

20. The apparatus of claim 16, wherein:
the friction device comprises a machine head with a rotating drive for one of the workpiece holders;
the other workpiece holder being arranged on a counter holder; and
the machine head and the counter holder are mounted on a machine frame for movement relative to each other along the process axis.

\* \* \* \* \*